United States Patent
Juesten et al.

(10) Patent No.: US 7,861,426 B2
(45) Date of Patent: Jan. 4, 2011

(54) OPTOMECHANICAL LEVELING DEVICE

(75) Inventors: Detlef Juesten, Fruemsen (CH); Roman Steffen, Rebstein (CH); Peter Bruggmueller, Feldkirch (AT); Petra Eyrich, Rebstein (CH)

(73) Assignee: Hilti Aktiengesellschaft, Schaan (LI)

( * ) Notice: Subject to any disclaimer, the term of this patent is extended or adjusted under 35 U.S.C. 154(b) by 133 days.

(21) Appl. No.: 12/316,236

(22) Filed: Dec. 9, 2008

(65) Prior Publication Data

US 2009/0193672 A1  Aug. 6, 2009

(30) Foreign Application Priority Data

Dec. 10, 2007  (DE)  ........................ 10 2007 055 746

(51) Int. Cl.
   *G01C 15/00*  (2006.01)
(52) U.S. Cl. ........................................ 33/291
(58) Field of Classification Search ............ 33/291
   See application file for complete search history.

(56) References Cited

U.S. PATENT DOCUMENTS

| | | | | |
|---|---|---|---|---|
| 2,533,686 A | * | 12/1950 | Peterson | ............... 33/275 G |
| 5,524,352 A | * | 6/1996 | Rando et al. | ............... 33/291 |
| 5,782,003 A | * | 7/1998 | Bozzo | ............... 33/291 |
| 6,493,952 B1 | * | 12/2002 | Kousek et al. | ............... 33/286 |
| 6,604,291 B2 | * | 8/2003 | Waibel et al. | ............... 33/283 |
| 6,606,798 B2 | * | 8/2003 | El-Katcha et al. | ............... 33/290 |
| 6,792,685 B1 | * | 9/2004 | Ng et al. | ............... 33/286 |
| 7,155,835 B2 | * | 1/2007 | Hayes et al. | ............... 33/286 |
| 7,310,886 B2 | * | 12/2007 | Bascom et al. | ............... 33/286 |
| 7,418,786 B2 | * | 9/2008 | Miyata | ............... 33/291 |
| 7,493,701 B2 | * | 2/2009 | Chen | ............... 33/291 |
| 7,571,546 B1 | * | 8/2009 | Sergyeyenko et al. | ............... 33/291 |
| 7,637,022 B2 | * | 12/2009 | Hayes | ............... 33/291 |

* cited by examiner

*Primary Examiner*—Christopher W Fulton
(74) *Attorney, Agent, or Firm*—Abelman, Frayne & Schwab

(57) ABSTRACT

An optomechanical leveling device (1) has an external housing (2) with a bottom surface (4), a carrier frame (6) located inside the external housing (2) and fastened in an elastically damped manner by means of damping elements (5) elastically preloaded along respective tensioning axes (S) and an optics carrier (7) suspended at the carrier frame (6) such that it can be oriented by the gravitational field (G).

9 Claims, 1 Drawing Sheet

OPTOMECHANICAL LEVELING DEVICE

BACKGROUND OF THE INVENTION

1. Field of the Invention

The invention relates to an optomechanical leveling device for emitting a laser beam which is oriented in a predetermined manner to the gravitational axis in the Earth's gravitational field, particularly to laser plummets, multiaxial lasers and rotary lasers.

2. Description of the Prior Art

Usually, an optics carrier (often with the laser radiation source) is suspended in an optomechanical leveling device inside the external housing in such a way that it can be oriented by the gravitational field.

Gravity-sensitive leveling devices of the type mentioned above are used particularly as construction lasers in construction-related industries for marking fastening points or defining planes. In this rough environment, the construction lasers mentioned above are frequently exposed to a variety of vibrations which they must withstand without a loss in quality.

European Publication EP 0 715 707 discloses a multiaxial laser which is oriented to the Earth's gravitational field. Two of the five laser beams span a horizontal and vertical plane, respectively. According to U.S. Pat. No. 5,539,990, each individual laser beam is additionally fanned out horizontally and vertically.

According to U.S. Patent Publication US 2007/0 113745, the optics carrier, which can be oriented by Earth's gravitational field, is suspended in a carrier frame together with the laser radiation source. The carrier frame is connected to the external housing by a bottom surface at four points in an elastically damped manner by damping elements. Two vertically oriented, sleeve-shaped damping elements are fixed, crosswise to one another, to the external housing at the top and at the bottom by screws. Further, the suspension which can be oriented is itself damped against shocks by two horizontally oriented, sleeve-shaped damping elements.

SUMMARY OF THE INVENTION

It is the object of the invention to further develop a shock-damped optomechanical leveling device.

Another object of the invention consists in a simple mounting of the damping elements, and an impact damping which is comparable in all directions.

These and other objects of the present invention, which will become apparent hereinafter, are achieved by providing an optomechanical leveling device having a carrier frame located inside an external housing having a bottom surface, which carrier frame is fastened in an elastically damped manner by means of damping elements elastically preloaded along a tensioning axes, with an optics carrier being suspended at the carrier frame such that it can be oriented by the gravitational field.

Because of the damping elements which are preloaded, per se, the carrier frame is always in a play-free basic position determined by the resulting preloaded force of all of the damping elements.

The damping elements are advantageously compressively preloaded so that, in the event of a shock, one half of the damping elements will be further compressed and the other half will be relieved.

All of the tensioning axes advantageously also extend inside the carrier frame and, further advantageously, through a common intersection so that the tensioning axes, which extend substantially radially with respect to the intersection, cause a self-stabilization (due to the resulting tensioning force) of the carrier frame in the external housing.

All of the tensioning axes advantageously extend at an angle greater than 30° and less than 60° relative to the bottom surface of the housing and, further advantageously, at an angle of 45° so that the carrier frame is tensioned by (spatial) diagonal forces in the external housing, so that the shock damping is comparable in all directions. Accordingly, particularly in a construction with eight damping elements arranged at the respective corners of a cube-shaped carrier frame, every four damping elements will always be shortened or lengthened with respect to the respective tensioning axis when there is an impact from any direction.

The carrier frame and/or the external housing advantageously have/has mounting elements extending perpendicular to the tensioning axes of the respective damping element so that no transverse forces occur between the mounting elements and the damping elements when there is tensioning along the tensioning axes.

The damping element advantageously has two insertion openings and, further advantageously, rectangular openings so that the damping element can be mounted in an adhesive-frictional engagement by insertion through these openings.

A mounting element of the carrier frame and of the external housing is advantageously inserted into an insertion opening of the damping element to facilitate mounting of the damping element.

The damping element advantageously comprises a viscoelastic elastomer with extensive damping such as, for example, a silicone rubber or a mixed-cell polyurethane (PUR) with a static Young's modulus from 1 to 10 N/mm$^2$ and a mechanical loss factor of more than 50% so that, in addition to a (nonlinearly elastic) elasticity sufficient for shock damping, there is also a sufficient visco-elastic damping which causes a rapid decay of the (inertia-dependent) impacted carrier frame.

The damping element advantageously has at least one zigzagging deformation area (which is open in the basic, non-tensioned state) so that the elasticity of the damping element is substantially increased with respect to tension but no stability failure occurs due to buckling in case of higher compressive strain due to the mutual contacting of the zigzag loops. Further, this construction reinforces a nonlinear deformation behavior.

In an advantageous manner, there are at least two zigzagging deformation areas whose zigzag loops engage in one another alternately so that a kind of parallelogram guide is achieved inside the damping element. By zigzagging is meant both a rounded loop shape and a V-shaped or U-shaped loop.

The optics carrier advantageously has a laser radiation source which is accordingly directly leveled along with the optics carrier.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 2:
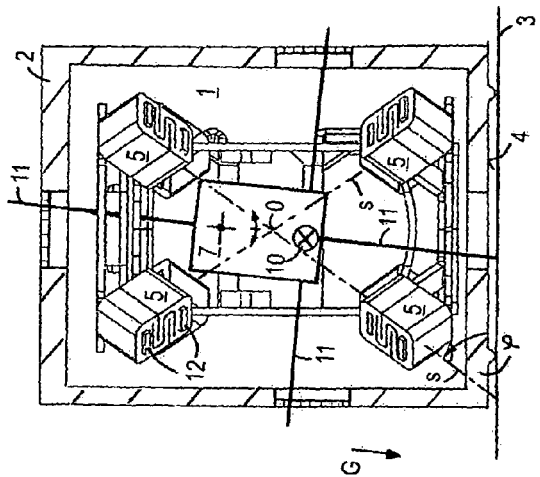
FIG. 2 a transverse cross-sectional view of the optomechanical leveling device according to the present invention.
Figure 1:
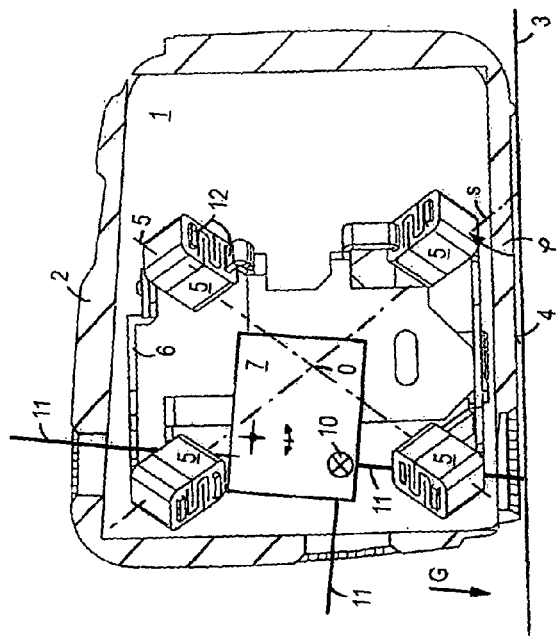
FIG. 1 a longitudinal cross-sectional view of an optomechanical leveling device according to the present invention.

As shown in FIGS. 1 and 2, an optomechanical leveling device 1 in the form of a multiaxial laser has a carrier frame 6 located inside an external housing 2 a bottom surface 4 of which is arranged on a substrate 3 which is inclined relative to the horizontal. The carrier frame 6 is supported by damping elements 5 so as to be elastically damped, and an optics carrier 7, which can be oriented by the gravitational field G, is suspended at the carrier frame 6. The optics carrier 7 has a laser radiation source 10 which emits a plurality of laser beams 11 which are oriented perpendicular to one another. The eight damping elements 5 (only the four rear damping elements are visible), each of which is arranged at a corner of the (cube-shaped) carrier frame 6, are preloaded elastically with respect to compression along a tensioning axis S which is inclined at an angle φ of approximately 45° relative to the bottom surface 4. All of the tensioning axes S also extend through a common intersection O within the carrier frame 6. In this connection, the carrier frame 6 and the external housing 2 each have mounting elements 12 which extend perpendicular to the tensioning axes S of the respective damping elements 5 and which are inserted in one of two rectangular insertion openings 8 (FIG. 3) of the damping element 5 in an adhesive frictional engagement. Each damping element 5 comprises a mixed-cell polyurethane (PUR) with a static Young's module of 3 N/mm$^2$, a mechanical loss factor of 55%, and a usable impact insulation up to area pressures of 1.40 N/mm$^2$.

Figure 4:
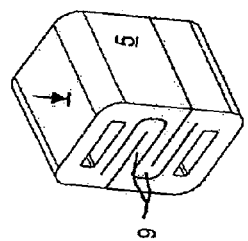
FIG. 4 a perspective view of the damping element in a highly compressively deformed state according to the present invention.
Figure 3:
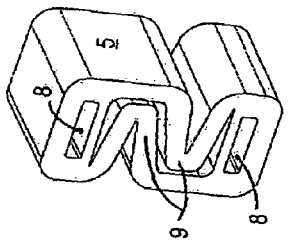
FIG. 3 a perspective view of a damping element according to the present invention.

According to FIG. 3, the damping element 5 has two zigzagging deformation areas 9 which are open in the non-tensioned basic state, shown, and whose zigzag loops engage in one another alternately and contact one another in a convoluted manner according to FIG. 4 under very high compressive strain.

Though the present invention was shown and described with references to the preferred embodiment, such is merely illustrative of the present invention and are not to be construed as a limitation thereof and various modifications of the present invention will be apparent to those skilled in the art. It is, therefore, not intended that the present invention be limited to the disclosed embodiment or details thereof, and the present invention includes all variations and/or alternative embodiments within the spirit and scope of the present invention as defined by the appended claims.

What is claimed is:

1. An optomechanical leveling device (1), comprising an external housing (2) having a bottom surface (4); a carrier frame (6) located in the external housing (2); damping elements (5) for elastically supporting the carrier frame (6) and elastically preloaded along respective tensioning axes (S); and an optics carrier (7) suspended on the carrier frame (6) so that it can be oriented by a gravitational field (G), wherein all of the tensioning axes (S) extend relative to the bottom surface (4) of the external housing (2) at an angle (φ) greater than 30° and less than 60°.

2. An optomechanical leveling device according to claim 1, wherein the damping elements (5) are compressively preloaded.

3. An optomechanical leveling device according to claim 1, wherein all of the tensioning axes (S) extend inside the carrier frame (6).

4. An optomechanical leveling device according to claim 1, wherein at least one of the carrier frame (6) and the external housing (2) has mounting elements (12) extending perpendicular to the tensioning axes (S) of the respective damping elements (5).

5. An optomechanical leveling device according to claim 4, wherein a mounting element (12) of the carrier frame (6) and a mounting element (12) of the external housing (2) are inserted, respectively, into an insertion opening (8) of the respective damping element (5).

6. An optomechanical leveling device according to claim 1, wherein a damping element (5) has two insertion openings (8).

7. An optomechanical leveling device according to claim 1, wherein the damping element (5) comprises a visco-elastic elastomer.

8. An optomechanical leveling device according to claim 1, wherein the optics carrier (7) has a laser radiation source (10).

9. An optomechanical leveling device (1), comprising an external housing (2) having a bottom surface (4); a carrier frame (6) located in the external housing (2); damping elements (5) for elastically supporting the carrier ' frame (6) and elastically preloaded along respective tensioning axes (S); and an optics carrier (7) suspended on the carrier frame (6) so that it can be oriented by a gravitational field (G), wherein the damping element (5) has at least two zigzagging deformation areas (9) zigzag loops of which alternately engage in one another.

* * * * *